United States Patent
Calundann et al.

(10) Patent No.: US 8,076,379 B2
(45) Date of Patent: *Dec. 13, 2011

(54) PROTON-CONDUCTING MEMBRANE AND THE USE THEREOF

(75) Inventors: Gordon Calundann, North Plainfield, NJ (US); Michael J. Sansone, Berkeley Heights, NJ (US); Oemer Uensal, Mainz (DE); Joachim Kiefer, Losheim am See (DE)

(73) Assignee: BASF Fuel Cell GmbH, Frankfurt (DE)

( * ) Notice: Subject to any disclaimer, the term of this patent is extended or adjusted under 35 U.S.C. 154(b) by 1355 days.

This patent is subject to a terminal disclaimer.

(21) Appl. No.: 10/519,281

(22) PCT Filed: Jun. 14, 2003

(86) PCT No.: PCT/EP03/06308
§ 371 (c)(1),
(2), (4) Date: Aug. 4, 2005

(87) PCT Pub. No.: WO2004/003061
PCT Pub. Date: Jan. 8, 2004

(65) Prior Publication Data
US 2006/0057449 A1    Mar. 16, 2006

(30) Foreign Application Priority Data
Jun. 27, 2002   (DE) .................................. 102 28 657

(51) Int. Cl.
*C08J 5/20* (2006.01)
*B29C 65/00* (2006.01)
*B05D 5/00* (2006.01)
*B01D 39/14* (2006.01)

(52) U.S. Cl. ...... 521/27; 521/30; 548/335.1; 548/343.5; 548/219; 548/156; 210/500.39; 429/30; 429/33

(58) Field of Classification Search .................. 521/27, 521/30; 429/30, 33; 548/335.1, 343.5, 219, 548/156; 210/500.39
See application file for complete search history.

(56) References Cited

U.S. PATENT DOCUMENTS

| | | |
|---|---|---|
| 3,313,783 A | 4/1967 | Iwakura et al. |
| 4,191,618 A | 3/1980 | Coker et al. |
| 4,212,714 A | 7/1980 | Coker et al. |
| 4,333,805 A | 6/1982 | Davidson et al. |
| 4,634,530 A | 1/1987 | Kuder et al. |
| 4,997,892 A | 3/1991 | Sansone et al. |
| 5,218,076 A | 6/1993 | Madison et al. |
| 5,525,436 A | 6/1996 | Savinell et al. |
| 7,235,320 B2 | 6/2007 | Calundann et al. |
| 7,332,530 B2 * | 2/2008 | Kiefer et al. ................... 521/27 |
| 7,384,552 B2 * | 6/2008 | Calundann et al. ...... 210/500.38 |
| 7,540,984 B2 * | 6/2009 | Calundann et al. ............. 264/41 |
| 7,582,210 B2 * | 9/2009 | Calundann et al. ...... 210/500.39 |
| 2004/0096734 A1 | 5/2004 | Calundann et al. |
| 2005/0053820 A1 | 3/2005 | Calundann et al. |
| 2005/0244694 A1 | 11/2005 | Kiefer et al. |
| 2006/0008690 A1 | 1/2006 | Uensal et al. |
| 2006/0035095 A1 | 2/2006 | Calundann et al. |
| 2006/0078774 A1 | 4/2006 | Uensal et al. |
| 2006/0079392 A1 | 4/2006 | Baurmeister et al. |
| 2006/0210881 A1 | 9/2006 | Calundann et al. |

FOREIGN PATENT DOCUMENTS

| | | |
|---|---|---|
| DE | 19844645 A1 | 4/1999 |
| DE | 10109829 A1 | 9/2002 |
| DE | 10117686 A1 | 10/2002 |
| DE | 10117687 A1 | 10/2002 |
| DE | 10144815 A1 | 3/2003 |
| JP | 2001-118591 | 4/2001 |
| WO | WO 96/13872 A1 | 5/1996 |
| WO | WO 02/088219 | 11/2002 |
| WO | WO 2006/117199 | 11/2006 |

OTHER PUBLICATIONS

Osaheni, et al, "Synthesis and Processing of Heterocyclic Polymers as Electronic, Optoelectronic, and Nonlinear Optical Materials," American Chemical Society, Easton (US), vol. 28 ( No. 4), p. 1172-1179, (Feb. 13, 1995).

* cited by examiner

*Primary Examiner* — Duc Truong
(74) *Attorney, Agent, or Firm* — Hammer & Associates, P.C.

(57) ABSTRACT

The present invention relates to a novel proton-conducting polymer membrane based on aromatic polyazoles which contain sulfonic acid groups and in which the sulfonic acid groups are covalently bound to the aromatic ring of the polymer and which can, owing to their excellent chemical and thermal properties, be used for a variety of purposes. Such materials are particularly useful for the production of polymer electrolyte membranes (PEMs) in PEM fuel cells.

19 Claims, No Drawings

PROTON-CONDUCTING MEMBRANE AND THE USE THEREOF

The present invention relates to a novel proton-conducting polymer membrane based on aromatic polyazoles which contain sulfonic acid groups and in which the sulfonic acid groups are covalently bound to the aromatic ring of the polymer and which can, owing to their excellent chemical and thermal properties, be used for a variety of purposes. Such materials are particularly useful for the production of polymer electrolyte membranes (PEMs) in PEM fuel cells.

Polymer electrolyte membrane fuel cells (PEMFCs) are based on a proton-conducting polymer membrane as electrolytes, viz. the polymer electrolyte membrane. A fuel cell in this case comprises a plurality of individual membrane electrode units (MEUs) connected in series. This MEU comprises the PEM which is coated on both sides with electrodes, with the interface between membrane and electrodes being laden with a noble metal catalyst, usually platinum. The electrochemical reaction of the fuel takes place over this catalyst at the three-phase boundary (fuel gas/catalyst/polymer electrolyte). Hydrogen-rich fuels such as hydrogen, methanol or natural gas are used as fuels at the anode. Oxygen-rich gas, usually air, is supplied to the opposite cathode side. The chemical energy of the fuels is in this way converted directly into electric energy and heat. Water is formed as reaction product. In this configuration, the PEM performs essential functions. Thus, it has to have a low permeability for the two fuels so as to act as separator, it has to have a high proton conductivity as electrolyte and at the same time has to have a high mechanical, chemical and thermal stability in order to allow long-term use at temperatures up to 200° C. in a strongly acidic medium without failure occurring. The cell performance and stability is therefore closely linked to the membrane quality.

Electrolytes employed for the fuel cell are solids such as polymer electrolyte membranes, ceramic oxides, molten carbonates or liquids such as phosphoric acid or potassium hydroxide solution. Recently, polymer electrolyte membranes have attracted attention as electrolytes for fuel cells. In principle, a distinction can be made between 2 categories of polymer electrolyte membranes.

The first category encompasses cation-exchange membranes comprising a polymer framework containing covalently bound acid groups, preferably sulfonic acid groups.

The sulfonic acid group is converted into an anion with release of a hydrogen ion and therefore conducts protons. The mobility of the proton and thus the proton conductivity is linked directly to the water content. If the membrane dries, e.g. as a result of a high temperature, the conductivity of the membrane and consequently the power of the fuel cell decreases drastically. The operating temperatures of fuel cells containing such cation-exchange membranes are thus limited to the boiling point of water. Materials used for polymer electrolyte membranes are thus, for example, perfluorosulfonic acid polymers. The perfluorosulfonic acid polymer (e.g. Nafion) generally has a perfluorinated hydrocarbon skeleton such as a copolymer of tetrafluoroethylene and trifluorovinyl and a side chain bearing a sulfonic acid group, e.g. a side chain bearing a sulfonic acid group bound to a perfluoroalkyl group. Moistening of the fuel represents a great technical challenge for the use of polymer electrolyte membrane fuel cells (PEMFCs) in which conventional, sulfonated membranes such as Nafion are used.

The second category which has been developed encompasses polymer electrolyte membranes comprising complexes of basic polymers and strong acids. Thus, WO 96/13872 and the corresponding U.S. Pat. No. 5,525,436 describe a process for producing a proton-conducting polymer electrolyte membrane, in which a basic polymer, for example a polyazole, is treated with a strong acid such as phosphoric acid, sulfuric acid, etc.

Polyazoles such as polybenzimidazoles (®Celazole) have been known for a long time. Such polybenzimidazoles (PBIs) are usually prepared by reaction of 3,3'-4,4'-tetraaminobiphenyl with isophthalic acid or diphenylisophthalic acid or esters thereof in the melt. The prepolymer formed solidifies in the reactor and is subsequently comminuted mechanically. The pulverulent prepolymer is subsequently subjected to final polymerization in the solid state at temperatures of up to 400° C. so as to give the desired polybenzimidazole.

To produce polymer films, the PBI is dissolved in polar, aprotic solvents such as dimethylacetamide (DMAc) in a further step and a film is produced by classical methods.

In a further step, the film of basic polymer or polymer blend is impregnated or doped with a strong acid, preferably a mineral acid. For this purpose, the film of a basic polymer or polymer blend is dipped into a strong acid, preferably phosphoric acid, so that the film is impregnated with the strong acid and becomes a proton-conducting membrane.

J. Electrochem. Soc. Volume 142, No. 7, 1995, pp. L121-L123, describes such doping of a polybenzimidazole in phosphoric acid.

Proton-conducting, i.e. acid-doped, polyazole membranes for use in PEM fuel cells are accordingly already known. The doped, basic polyazole films then act as proton conductors and separators in polymer electrolyte membrane fuel cells (PEM fuel cells).

Owing to the excellent properties of the polyazole polymer, such polymer electrolyte membranes can, when converted into membrane-electrode units (MEUs), be used in fuel cells at long-term operating temperatures above 100° C., in particular above 120° C. This high long-term operating temperature allows the activity of the catalysts based on noble metals which are present in the membrane-electrode unit (MEU) to be increased. Particularly when using products from the reforming of hydrocarbons, significant amounts of carbon monoxide are present in the reformer gas and usually has to be removed by means of a complicated gas processing or gas purification step. The possibility of increasing the operating temperature enables significantly higher concentrations of CO impurities to be tolerated over the long term.

The use of polymer electrolyte membranes based on polyazole polymers firstly enables the complicated gas processing or gas purification step to be dispensed with in some cases and secondly enables the catalyst loading in the membrane-electrode unit to be reduced. Both are indispensable prerequisites for large-scale use of PEM fuel cells, since otherwise the costs of a PEM fuel cell system are too high.

The previously known acid-doped polymer membranes based on polyazoles display a favorable property profile. However, owing to the applications desired for PEM fuel cells, in particular in the automobile sector and in decentralized power and heat generation (stationary sector), these need to be improved overall. Furthermore, the previously known polymer membranes have a high content of dimethylacetamide (DMAc) which cannot be removed completely by means of known drying methods. The German patent application No. 10109829.4 describes a polymer membrane which is based on polyazoles and in which the DMAc contamination has been eliminated. Although such polymer membranes display improved mechanical properties, specific conductivities do not exceed 0.1 S/cm (at 140° C.).

A significant advantage of such a membrane doped with phosphoric acid is the fact that this system can be operated at temperatures above 100° C. without the moistening of the fuels which is otherwise necessary. This is due to the ability of phosphoric acid to transfer protons without addition of water by means of the "Grotthus mechanism" (K.-D. Kreuer, Chem. Mater. 1996, 8, 610-641). Such a water-free transport mechanism is of particular interest for use in a direct methanol fuel cell. Here, the fuel used is methanol which can be oxidized directly without the necessity of a preceding reforming step. To achieve the possibility of water-free proton transport, methanol is not carried along with the migrating proton in the form of a hydrating shell as is usual in the "vehicle" mechanism (K.-D. Kreuer, Chem. Mater. 1996, 8, 610-641). The power and efficiencies of a direct methanol fuel cell can be improved by reducing this methanol "crossover".

The possibility of operation at temperatures above 100° C. results in further advantages for the fuel cell system. Firstly, the sensitivity of the Pt catalyst to impurities in the gas, in particular CO, is greatly reduced and the catalytic activity is improved. CO is formed as by-product in the reforming of the hydrogen-rich gas comprising hydrocarbon compounds, e.g. natural gas, methanol or petroleum spirit, or as intermediate in the direct oxidation of methanol. The CO content of the fuel typically has to be less than 100 ppm at temperatures of <100° C. However, at temperatures in the range 150-200°, 10 000 ppm or more of CO can also be tolerated (N. J. Bjerrum et al., Journal of Applied Electrochemistry, 2001, 31, 773-779). This leads to significant simplifications of the upstream reforming process and thus to cost reductions for the total fuel cell system.

In addition to the abovementioned acid-doped polymer membranes produced by means of intensive processes, a polymer electrolyte membrane comprising a basic polymer can also be produced directly from polyphosphoric acid. For this purpose, the starting monomers as described in the German patent application No. 10117686.4 or the prepolymers as described in the German patent application No. 10144815.5 or the infusible starting polymer as described in the German patent application No. 10117687.2 are/is dissolved in polyphosphoric acid and subsequently spread directly by means of a doctor blade as proton-conducting membrane without subsequent treatment such as drying, washing and doping being necessary. The main advantage of this method is process simplification. In addition, new types of polymer electrolyte membrane can be tailor-made by means of targeted selection of the monomers.

Apart from the abovementioned materials, corresponding processes for sulfonating polymers are also known from the prior art.

To produce a PEM from a sulfonated polyether ketone (PEK), the PEK polymer is firstly dissolved in a suitable solvent, e.g. concentrated sulfuric acid, after which an aggressive sulfonating agent such as oleum or chlorosulfonic acid is added. This sulfonated polymer is separated from the sulfonation solution in a further process step. For further processing, it then has to be converted into the neutral salt form by means of a basic solution in a further step. The polymer is subsequently brought back into solution and, in a further process step, a polymer film is produced by film casting or spreading by means of a doctor blade. The solvent, preferably N-methylpyrrolidone or N-dimethylacetamide is evaporated by drying. The film then has to be treated with acid again and subsequently washed until neutral. As an alternative, a polymer film which has been produced beforehand by means of extrusion or film casting and subsequently modified by radiation grafting, e.g. a styrene-modified, partially fluorinated membrane, can be treated with a sulfonation solution comprising chlorosulfonic acid and an anhydrous solvent, e.g. tetrachloroethane (EP-A-667983, DE-A-19844645).

In these sulfonation processes using very strong sulfonating agents, uncontrolled sulfonation at many places on the polymer takes place. The sulfonation can also lead to chain rupture and thus to impairment of the mechanical properties and finally to premature failure of the fuel cell.

Sulfonated polybenzimidazoles, too, are already known from the literature. Thus, U.S. Pat. No. 4,634,530 describes a sulfonation of an undoped polybenzimidazole film by means of a sulfonating agent such as sulfuric acid or oleum in the temperature range up to 100° C.

Furthermore, Staiti et al. (P. Staiti in J. Membr. Sci. 188 (2001) 71) have described the preparation and properties of sulfonated polybenzimidazole. It was in this case not possible to carry out the sulfonation of the polymer in the solution. On addition of the sulfonating agent to the PBI/DMAc solution, the polymer precipitates. To carry out the sulfonation, a PBI film was produced first and this was dipped into a dilute sulfuric acid. The specimens were then treated at temperatures of about 475° C. for 2 minutes to effect sulfonation. The sulfonated PBI membranes have only a maximum conductivity of $7.5*10^{-5}$ S/cm at a temperature of 160° C. The maximum ion-exchange capacity is 0.12-meq/g. It was likewise shown that such sulfonated PBI membranes are not suitable for use in a fuel cell.

The production of sulfoalkylated PBI membranes by reacting a hydroxyethyl-modified PBI with a sultone is described in U.S. Pat. No. 4,997,892. On the basis of this technology, it is possible to produce sulfopropylated PBI membranes (Sanui et al. in Polym. Adv. Techn. 11 (2000) 544). The proton conductivity of such membranes is $10^{-3}$ S/cm and is thus too low for use in fuel cells in which 0.1 S/cm is sought.

It is an object of the present invention to provide a sulfonated, high-temperature-stable polymer membrane having a high conductivity even at high operating temperatures. This object is achieved by the provision of a polymer electrolyte membrane comprising sulfonated polyazoles doped with phosphoric acid. The sulfonation of the polyazole is effected by addition of a suitable sulfonating agent during or immediately after the polymerization to produce the polyazoles.

The present invention provides a proton-conducting polymer membrane which is based on sulfonated polyazoles and is obtainable by a process comprising the steps A) mixing of one or more aromatic tetraamino compounds with one or more aromatic carboxylic acids or esters thereof which contain at least two acid groups per carboxylic acid monomer, or mixing of one or more aromatic and/or heteroaromatic diaminocarboxylic acids, in a polyphosphoric acid/sulfonating agent mixture to form a solution and/or dispersion, B) application of a layer using the mixture from step A) to a support or an electrode, C) heating of the sheet-like structure/layer obtainable according to step B) under inert gas at temperatures of up to 350° C., preferably up to 280° C., to form the polyazole polymer, D) treatment of the membrane formed in step C), preferably until it is self-supporting.

The aromatic and heteroaromatic tetraamino compounds used according to the invention are preferably 3,3',4,4'-tetraaminobiphenyl, 2,3,5,6-tetraaminopyridine, 1,2,4,5-tetraaminobenzene, bis(3,4-diaminophenyl) sulfone, bis(3,4-diaminophenyl) ether, 3,3',4,4'-tetraaminobenzophenone, 3,3',4,4'-tetraaminodiphenylmethane and 3,3',4,4'-tetraaminodiphenyldimethylmethane and their salts, in particular their monohydrochloride, dihydrochloride, trihydrochloride and tetrahydrochloride derivatives.

The aromatic carboxylic acids using step A) are, in particular, dicarboxylic acids, tricarboxylic acids and tetracarboxylic acids or their esters or their anhydrides.

The term aromatic carboxylic acids likewise encompasses heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-dicarboxyphenyl) sulfone, biphenyl-4,4'-dicarboxylic acid, 4-trifluoromethylphthalic acid, 2,2-bis(4-carboxyphenyl)hexafluoropropane, 4,4'-stilbenedicarboxylic acid, 4-carboxycinnamic acid, or their C1-C20-alkyl esters or C5-C12-aryl esters, or their acid anhydrides or acid chlorides. The aromatic tricarboxylic acids, tetracarboxylic acids or their C1-C20-alkyl esters or C5-C12-aryl esters or their acid anhydrides or their acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or their C1-C20-alkyl esters or C5-C12-aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used according to the invention are heteroaromatic dicarboxylic acids and tricarboxylic acids and tetracarboxylic acids or their esters or their anhydrides. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides.

The content of tricarboxylic acids or tetracarboxylic acids (based on dicarboxylic acid used) is in the range from 0 to 30 mol %, preferably from 0.1 to 20 mol %, in particular from 0.5 to 10 mol %.

Mixtures of at least 2 different aromatic carboxylic acids are preferably used in step A). Particular preference is given to using mixtures comprising not only aromatic carboxylic acids but also heteroaromatic carboxylic acids. The mixing ratio of aromatic carboxylic acids to heteroaromatic carboxylic acids is from 1:99 to 99:1, preferably from 1:50 to 50:1.

These mixtures are, in particular, mixtures of N-heteroaromatic dicarboxylic acids and aromatic dicarboxylic acids. Nonlimiting examples are isophthalic acid, terephthalic acid, phthalic acid, 2,5-dihydroxyterephthalic acid, 2,6-dihydroxyiso-phthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoro-methylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The aromatic and heteroaromatic diaminocarboxylic acids used according to the invention are preferably diaminobenzoic acid and their monohydrochloride and dihydrochloride derivatives.

The polyphosphoric acid used in step A) is a commercial polyphosphoric acid as can be obtained, for example, from Riedel-de Haen. The polyphosphoric acids $H_{n+2}P_nO_{3n+1}$ (n>1) usually have an assay calculated as $P_2O_5$ (acidimetric) of at least 83%. In place of a solution of the monomers, it is also possible to produce a dispersion/suspension. The mixture produced in step A) has a weight ratio of polyphosphoric acid to the sum of all monomers of from 1:10 000 to 10 000:1, preferably from 1:1000 to 1000:1, in particular from 1:100 to 100:1.

The sulfonating agent used in step A) can be i) concentrated sulfuric acid (>95%), ii) chlorosulfonic acid, iii) a complex of $SO_3$ with a Lewis base or other organic constituents, iv) an acyl or alkyl sulfate, v) an organic sulfonic acid or vi) a mixture of i to v.

The amount of sulfonating agent used is from 1 to 20% by weight based on the polyphosphoric acid, preferably from 2 to 15% by weight and very particularly preferably 5-10% by weight.

The layer formation in step B) is carried out by measures known per se (casting, spraying, spreading by doctor blade) known per se from the prior art for polymer film production. As supports, it is possible to use all supports which are inert under the conditions. To adjust the viscosity, the solution can, if appropriate, be admixed with phosphoric acid (concentrated phosphoric acid, 85%). In this way, the viscosity can be set to the desired value and the formation of the membrane can be made easier. The layer produced in step B) has a thickness of from 20 to 4000 µm, preferably from 30 to 1500 µm, in particular from 50 to 500 µm.

The polyazole-based polymer formed in step C) comprises recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII).

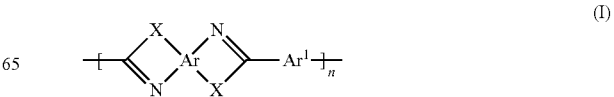

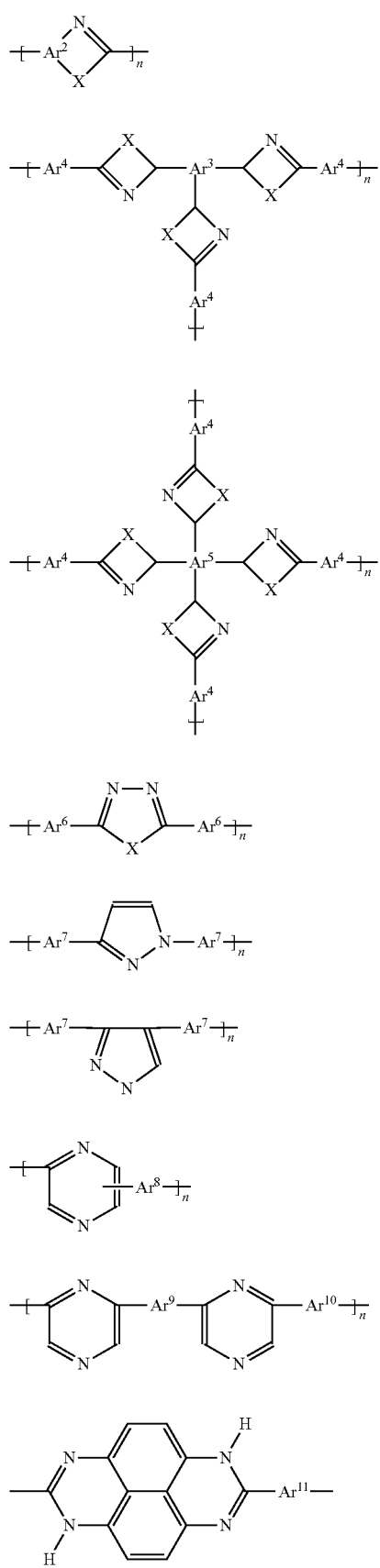
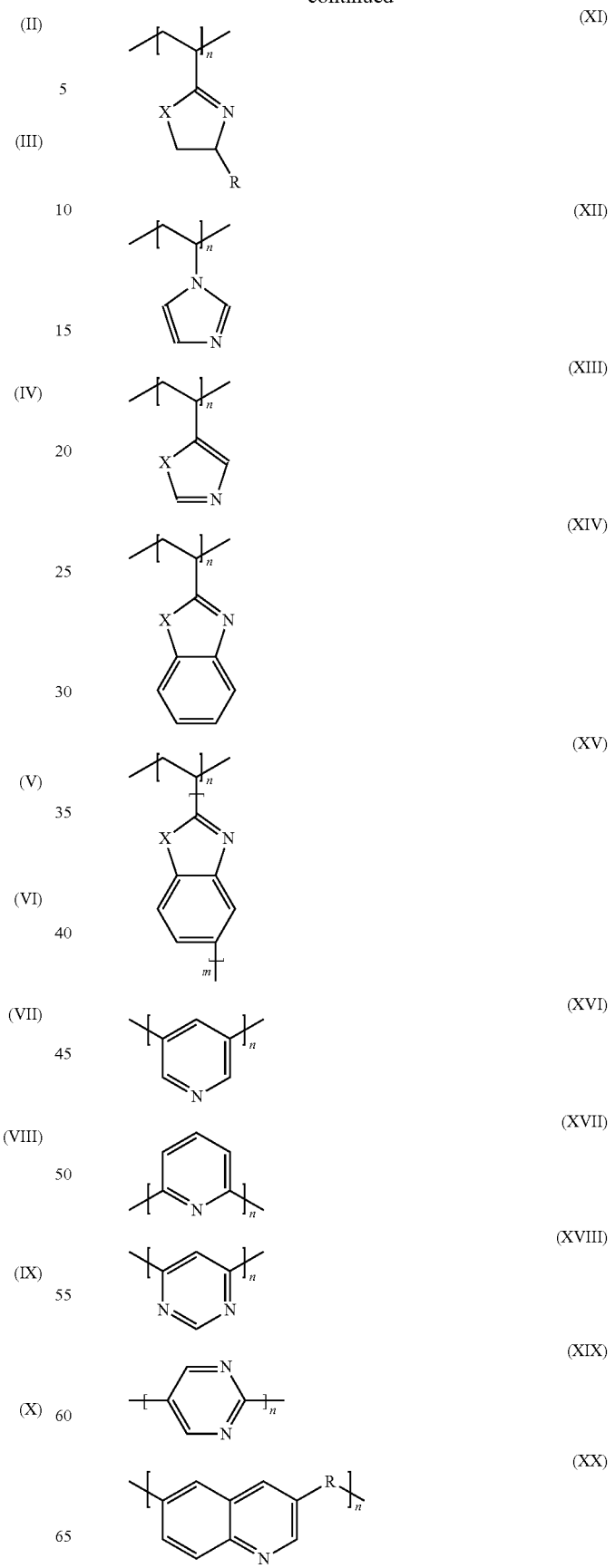

-continued

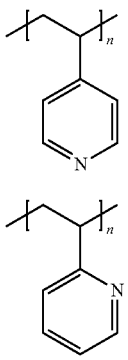

(XXI)

(XXII)

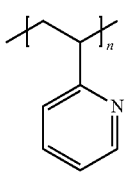

where
the radicals Ar are identical or different and are each a tetravalent aromatic or heteroaromatic group which can be monocyclic or polycyclic,
the radicals $Ar^1$ are identical or different and are each a divalent aromatic or heteroaromatic group which can be monocyclic or polycyclic,
the radicals $Ar^2$ are identical or different and are each a divalent or trivalent aromatic or heteroaromatic group which can be monocyclic or polycyclic,
the radicals $Ar^3$ are identical or different and are each a trivalent aromatic or heteroaromatic group which can be monocyclic or polycyclic,
the radicals $Ar^4$ are identical or different and are each a trivalent aromatic or heteroaromatic group which can be monocyclic or polycyclic,
the radicals $Ar^5$ are identical or different and are each a tetravalent aromatic or heteroaromatic group which can be monocyclic or polycyclic,
the radicals $Ar^6$ are identical or different and are each a divalent aromatic or heteroaromatic group which can be monocyclic or polycyclic,
the radicals $Ar^7$ are identical or different and are each a divalent aromatic or heteroaromatic group which can be monocyclic or polycyclic,
the radicals $Ar^8$ are identical or different and are each a trivalent aromatic or heteroaromatic group which can be monocyclic or polycyclic,
the radicals $Ar^9$ are identical or different and are each a divalent or trivalent or tetravalent aromatic or heteroaromatic group which can be monocyclic or polycyclic,
the radicals $Ar^{10}$ are identical or different and are each a divalent or trivalent aromatic or heteroaromatic group which can be monocyclic or polycyclic,
the radicals $Ar^{11}$ are identical or different and are each a divalent aromatic or heteroaromatic group which can be monocyclic or polycyclic,
the radicals X are identical or different and are each oxygen, sulfur or an amino group which bears a hydrogen atom, a group having 1-20 carbon atoms, preferably a branched or unbranched alkyl or alkoxy group, or an aryl group as further radical,
the radicals R are identical or different and are each hydrogen, an alkyl group or an aromatic group and n, m are each an integer greater than or equal to 10, preferably greater than or equal to 100,
and has a sulfur content of from 2 to 20% by weight (determined by means of elemental analysis), in particular from 4 to 10% by weight.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotri-azole, benzoxathiadiazole, benzoxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, acridine, phenazine, benzoquinoline, phenoxazine, phentothiazine, acridizine, benzopteridine, phenanthroline and phenanthrene, which may also be substituted.

$Ar^1$, $Ar^4$, $Ar^6$, $Ar^7$, $Ar^8$, $Ar^9$, $Ar^{10}$, $Ar^{11}$ can have any substitution pattern; in the case of phenylene, $Ar^1$, $Ar^4$, $Ar^6$, $Ar^7$, $Ar^8$, $Ar^9$, $Ar^{10}$, $Ar^{11}$ can be, for example, ortho-, meta- or para-phenylene. Particularly preferred groups are derived from benzene and biphenylene, which may also be substituted.

Preferred alkyl groups are short-chain alkyl groups having from 1 to 4 carbon atoms, e.g. methyl, ethyl, n- or i-propyl and t-butyl groups.

Preferred aromatic groups are phenyl or naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles having recurring units of the formula (I) in which the radicals X within one recurring unit are identical.

The polyazoles can in principle also have different recurring units which differ, for example, in their radical X. However, preference is given to only identical radicals X being present in a recurring unit.

Further, preferred polyazole polymers are polyimidazoles, polybenzothiazoles, polybenzoxazoles, polyoxadiazoles, polyquinoxalines, polythiadiazoles, poly-(pyridines), poly (pyrimidines) and poly(tetrazapyrenes).

In a further embodiment of the present invention, the polymer comprising recurring azole units is a copolymer or a blend comprising at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer comprising recurring azole units is a polyazole comprising only units of the formula (I) and/or (II).

The number of recurring azol units in the polymer is preferably greater than or equal to 10. Particularly preferred polymers contain at least 100 recurring azole units.

For the purposes of the present invention, polymers comprising recurring benzimidazole units are preferred. Some examples of extremely advantageous polymers comprising recurring benzimidazole units are represented by the following formulae:

11 12
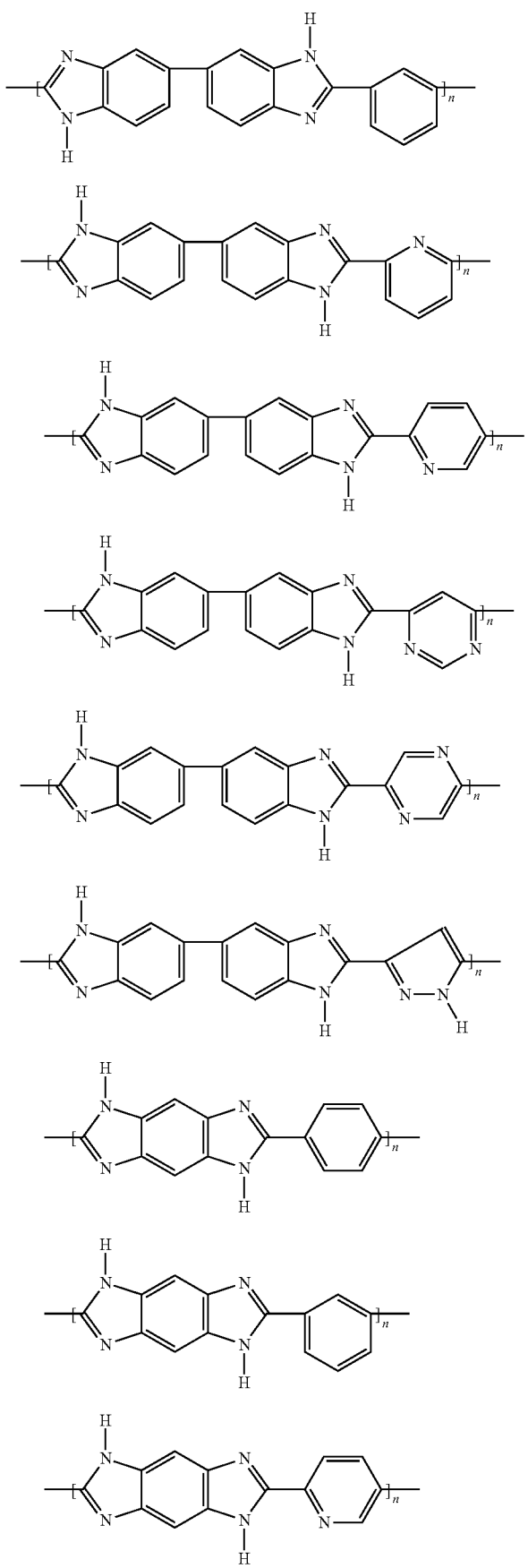
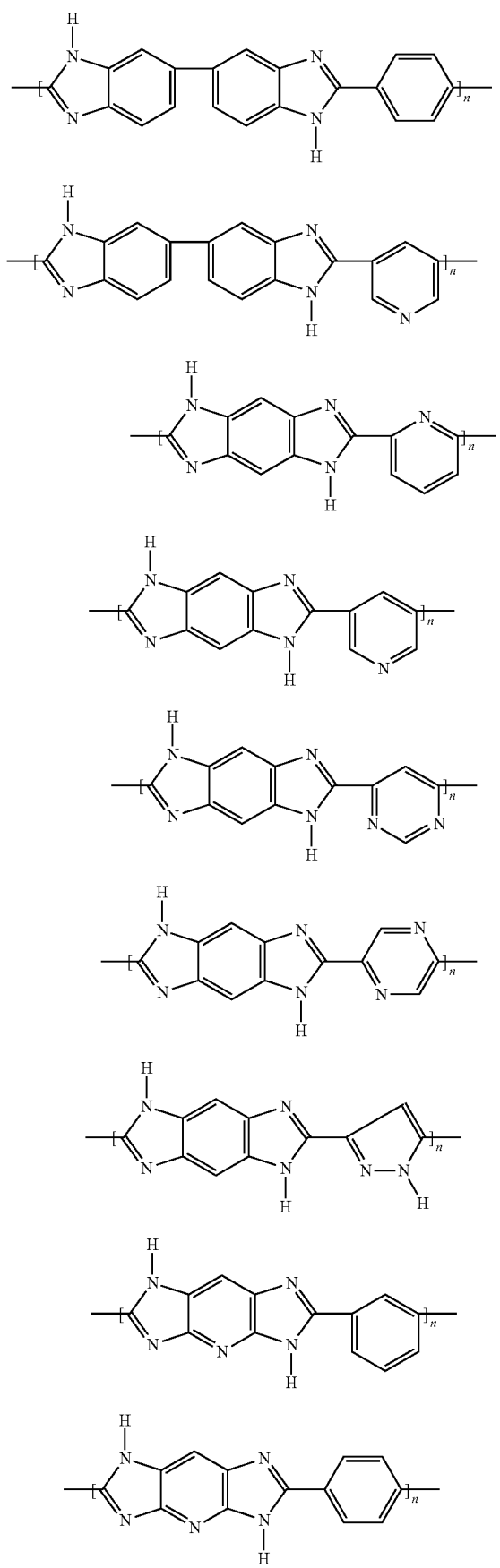

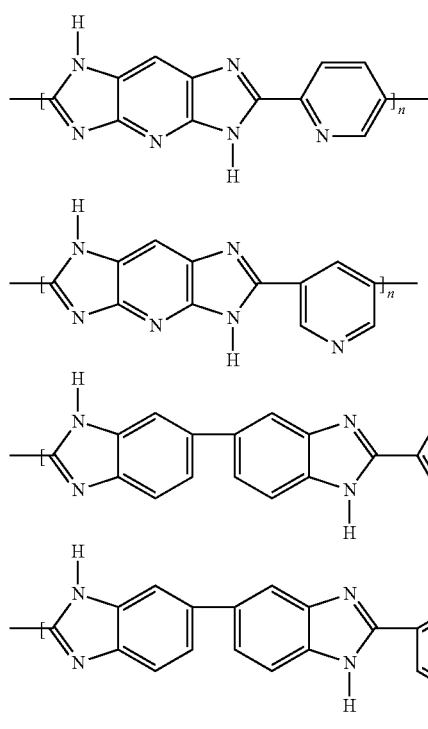
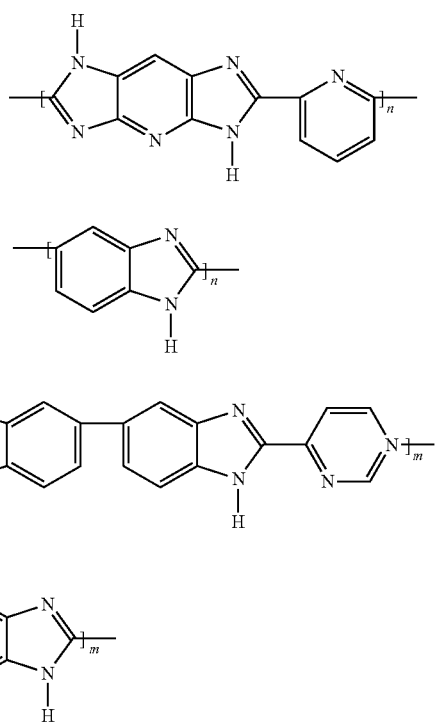

where n and m are each an integer greater than or equal to 10, preferably greater than or equal to 100.

The polyazoles obtainable by means of the process described, but in particular the polybenzimidazoles, have a high molecular weight. Measured as intrinsic viscosity, it is at least 1.4 dl/g and is thus significantly above that of commercial polybenzimidazole (IV<1.1 dl/g).

If tricarboxylic acids and/or tetracarboxylic acids are present in the mixture obtained in step A), they effect branching/crosslinking of the polymer formed. This contributes to an improvement in the mechanical properties. The polymer layer produced in step C) is treated in the presence of moisture at temperatures and for a time sufficient for the layer to have sufficient strength for use in fuel cells. The treatment can be carried out until the membrane is self-supporting, so that it can be detached from the support without damage.

In one variant of the process, the formation of oligomers and/or polymers can be brought about by heating the mixture from step A) to temperatures of up to 350° C., preferably up to 280° C. Depending on the temperature and time selected, the heating in step C) may be able to be partly or entirely omitted. This variant is also provided by the present invention.

Furthermore, it has been found that when using aromatic dicarboxylic acids (or heteroaromatic dicarboxylic acids) such as isophthalic acid, terephthalic acid, 2,5-dihydroxyterephthalic acid, 4,6-dihydroxyisophthalic acid, 2,6-dihydroxyisophthalic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, the temperature in step C), or if the formation of oligomers and/or polymers is desired as early as step A), is advantageously in the range up to 300° C., preferably in the range from 100° C. to 250° C.

The treatment of the membrane in step D) is carried out at temperatures above 0° C. and less than 150° C., preferably at temperatures in the range from 10° C. to 120° C., in particular from room temperature (20° C.) to 90° C., in the presence of moisture or water and/or steam. The treatment is preferably carried out under atmospheric pressure, but can also be carried out under superatmospheric pressure. It is important that the treatment is carried out in the presence of sufficient moisture, as a result of which the polyphosphoric acid present contributes to strengthening of the membrane by partial hydrolysis to form low molecular weight polyphosphoric acid and/or phosphoric acid.

The partial hydrolysis of the polyphosphoric acid in step D) leads to strengthening of the membrane and to a decrease in the layer thickness and formation of a membrane having a thickness of from 15 to 3000 μm, preferably from 20 to 2000 μm, in particular from 20 to 1500 μm, which is self-supporting. The intramolecular and intermolecular structures present in the polyphosphoric acid layer formed in step B) lead in step C) to ordered membrane formation, which is responsible for the particular properties of the membrane formed.

The upper temperature limit to the treatment in step D) is generally 150° C. In the case of extremely brief action of moisture, for example of superheated steam, this steam can also be hotter than 150° C. The duration of the treatment is important in determining the upper temperature limit.

The partial hydrolysis (step D) can also be carried out in chambers having a controlled temperature and humidity, in which case the hydrolysis can be controlled in a targeted fashion in the presence of a defined amount of moisture. The humidity can be set to a specific value by means of the temperature or saturation of the environment in contact with the membrane, for example gases such as air, nitrogen, carbon dioxide or other suitable gases or steam. The treatment time is dependent on the parameters selected above.

The treatment time is also dependent on the thickness of the membrane.

In general, the treatment time ranges from a few seconds to some minutes, for example in the presence of superheated steam, or up to entire days, for example in air at room temperature and relatively low atmospheric humidity. The treatment time is preferably from 10 seconds to 300 hours, in particular from 1 minute to 200 hours.

If the partial hydrolysis is carried out at room temperature (20° C.) by means of ambient air at a relative atmospheric humidity of 40-80%, the treatment time is in the range from 1 to 200 hours.

The treatment with water in step D) can also be carried out to such a degree that the phosphoric acid is completely removed from the membrane.

The membrane obtained according to step D) can be self-supporting, i.e. it can be detached from the support without damage and subsequently, if appropriate, be directly used further.

The concentration of phosphoric acid and thus the conductivity of the polymer membrane of the invention can be set via the degree of hydrolysis, i.e. the time, temperature and ambient humidity. According to the invention, the concentration of the phosphoric acid is reported as mole of acid per mole of repeating units of the polymer. For the purposes of the present invention, a concentration (mole of phosphoric acid per mole of repeating units of the formula (III), i.e. polybenzimidazole) of from 10 to 25, in particular from 12 to 20, is preferred. Such high degrees of doping (concentrations) can be obtained only with great difficulty, if at all, by doping of polyazoles with commercially available ortho-phosphoric acid.

Subsequent to the treatment according to step D), the membrane can be additionally crosslinked on the surface by the action of heat in the presence of atmospheric oxygen. This hardening of the membrane surface achieves an additional improvement in the properties of the membrane.

Crosslinking can also be effected by action of IR or NIR (IR-infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is in the range from 5 to 200 kGy.

The polymer membrane of the invention displays improved materials properties compared to the previously known doped polymer membranes. In particular, it displays improved power compared to known doped polymer membranes. This is due, in particular, to an improved proton conductivity at temperatures above and below 100° C. without moistening of the membrane. The specific conductivity both at room temperature and at 120° C. is at least 0.06 S/cm, preferably at least 0.08 S/cm, in particular at least 0.09 S/cm.

To achieve a further improvement in the use properties, fillers, in particular proton-conducting fillers, and additional acids can also be added to the membrane. The addition can be carried out either in step A) or after the polymerization.

Nonlimiting examples of proton-conducting fillers are
sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$,
phosphates such as $Zr_3(PO_4)_4$, $Zr(HPO_4)_2$, $HZr_2(PO_4)_3$, $UO_2PO_43H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$,
polyacids such as $H_3PW_{12}O_{40}.nH_2O$ (n=21-29), $H_3SiW_{12}O_{40}.nH_2O$ (n=21-29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$,
selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$,
oxides such as $Al_2O_3$, $Sb_2O_5$, $ThO_2$, $SnO_2$, $ZrO_2$, $MoO_3$,
silicates such as zeolites, zeolites($NH_4+$), sheet silicates, framework silicates, H-natrolites, H-mordenites, $NH_4$-analcines, $NH_4$-sodalites, $NH_4$-gallates, H-montmorillonites,
acids such as $HClO_4$, $SbF_5$,
fillers such as carbides, in particular SiC, $Si_3N_4$, fibers, in particular glass fibers, glass powders and/or polymer fibers, preferably ones based on polyazoles.

In addition, this membrane can further comprise perfluorinated sulfonic acid additives (0.1-20% by weight, preferably 0.2-15% by weight, very particularly preferably 0.2-10% by weight). These additives lead to an increase in power, in the vicinity of the cathode to an increase in the oxygen solubility and oxygen diffusion and to a reduction in the adsorption of phosphoric acid and phosphate onto platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896-902 and Perfluorosulfonimide as an additive in phosphoric acid fuel cell. Razaq, M.; Razaq, A.; Yeager, E.; DesMarteau, Darryl, D.; Singh, S. Case Cent. Electrochem. Sci., Case West, Reserve Univ., Cleveland, Ohio, USA. J. Electrochem. Soc. (1989), 136(2), 385-90.)

Nonlimiting examples of persulfonated additives are:
trifluoromethanesulfonic acid, potassium trifluoromethanesulfonate, sodium trifluoromethanesulfonate, lithium trifluoromethanesulfontate, ammonium trifluoro-methanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

Furthermore, the membrane can further comprise additives which scavenge (primary antioxidants) or destroy (secondary antioxidants) the free peroxide radicals produced in the reduction of oxygen during operation and thereby improve the life and stability of the membrane and membrane-electrode unit as described in JP2001118591 A2. The mode of action and molecular structure of such additives are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are:
bis(trifluoromethyl) nitroxide, 2,2,-diphenyl-1-picrinylhydrazyl, phenols, alkylphenols, sterically hindered alkylphenols such as Irganox, aromatic amines, sterically hindered amines such as Chimassorb; sterically hindered hydroxylamines, sterically hindered alkylamines, sterically hindered hydroxylamines, sterically hindered hydroxylamine ethers, phosphites such as Irgafos, nitrosobenzene, methyl-2-nitrosopropane, benzophenone, benzaldehyde tert-butyl nitron, cysteamine, melanines, lead oxides, manganese oxides, nickel oxides, cobalt oxides.

Possible fields of use of the doped polymer membranes of the invention include, inter alia, use in fuel cells, in electrolysis, in capacitors and in battery systems. Owing to their property profile, the doped polymer membranes are preferably used in fuel cells.

The present invention also provides a membrane-electrode unit comprising at least one polymer membrane according to the invention. For further information on membrane-electrode units, reference may be made to the specialist literature, in particular the U.S. Pat. No. 4,191,618, U.S. Pat. No. 4,212,714 and U.S. Pat. No. 4,333,805. The disclosure of the above-mentioned references [U.S. Pat. No. 4,191,618, U.S. Pat. No. 4,212,714 and U.S. Pat. No. 4,333,805] in respect of the structure and the production of membrane-electrode units and also the electrodes, gas diffusion layers and catalysts to be selected is incorporated by reference into the present description.

In one variant of the present invention, membrane formation can be carried out directly on the electrode rather than on a support. The treatment according to step D) can in this way be correspondingly shortened, since the membrane no longer has to be self-supporting. Such a membrane or coated electrode is also provided by the present invention.

The polymerization/formation of the oligomers can also occur in step A) and the solution can be applied to the electrode by means of a doctor blade. Step C) can then be partly or entirely omitted.

The above-described variants and preferred embodiments also apply to this case, so that they will not be repeated at this point.

The coating obtained in step D) has a thickness of from 2 to 3000 μm, preferably from 3 to 2000 μm, in particular from 5 to 1500 μm.

An electrode which has been coated in this way can be installed in a membrane-electrode unit which, if appropriate, has at least one polymer membrane according to the invention.

General Measurement Methods:
Measurement methods for IEC

The conductivity of the membrane depends strongly on the content of acid groups expressed as the ion-exchange capacity (IEC). To measure the ion-exchange capacity, a specimen having a diameter of 3 cm is stamped out and placed in a glass beaker containing 100 ml of water. The acid liberated is titrated with 0.1M NaOH. The specimen is subsequently taken up, excess water is dabbed off and the specimen is dried at 160° C. for 4 hours. The dry weight, $m_0$, is then determined gravimetrically to a precision of 0.1 mg. The ion-exchange capacity is then calculated from the consumption of 0.1M NaOH to the first titration end point, $V_1$ in ml, and the dry weight, $m_0$ in mg, according to the following formula:

$$IEC=V_1*300/m_0$$

Measurement Method for Specific Conductivity

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model comprising a parallel arrangement of an ohmic resistance and a capacitor. The specimen cross section of the membrane doped with phosphoric acid is measured immediately before mounting of the specimen. To measure the temperature dependence, the measurement cell is brought to the desired temperature in an oven and the temperature is regulated by means of a Pt-100 resistance thermometer positioned in the immediate vicinity of the specimen. After the temperature has been reached, the specimen is maintained at this temperature for 10 minutes before commencement of the measurement.

EXAMPLES

Stock Solution for the Preparation of PBI Membranes Sulfonated In Situ 938.6 g of polyphosphoric acid (83.4±0.5% of $P_2O_5$) were added to a mixture of 26.948 g of isophthalic acid and 34.74 g of 3,3',4,4'-tetraaminobiphenyl in a 1.5 l flask equipped with nitrogen inlet and outlet and a mechanical stirrer. This mixture was heated at 120° C. for 2 hours, at 150° C. for 3 hours and at 180° C. for 2 hours. The reaction solution was then heated at 220° C. and stirred for 14 hours. The resulting 5% strength PBI solution in PPA was cooled to RT and used for producing the following sulfonated PBI membranes.

A small part of the solution was precipitated by means of water. The precipitated resin was filtered off, washed three times with $H_2O$, neutralized with ammonium hydroxide, then washed with $H_2O$ and dried at 100° C. and 0.001 bar for 16 hours. The inherent viscosity $\eta_{inh}$ was measured on a 0.4% strength PBI solution in 100 ml of 96% strength $H_2SO_4$, giving a value of 1.52 dl/g.

Specimen 1: (PPA/1sPBI Membrane)

22.34 g of 85% strength phosphoric acid and 1.66 g of 96% strength sulfuric acid were added to 100 g of the above-described 5% strength PBI stock solution in 113.6% of PPA at 220° C. over a period of 30 minutes. This solution was stirred at 220° C. for a further 4 hours. The resulting sulfonated PBI solution in PPA was applied to a glass plate at 220° C. by means of a preheated doctor blade (381 μm). A transparent membrane was obtained. The membrane was then allowed to stand at RT for 1 day, giving a self-supporting membrane.

Specimen 2: (PPA/2sPBI Membrane)

17.24 g of 85% strength phosphoric acid and 3.314 g of 96% strength sulfuric acid were added to 100 g of the above-described 5% strength PBI stock solution in 113.6% of PPA at 220° C. over a period of 30 minutes. This solution was stirred at 220° C. for a further 4 hours. The resulting sulfonated PBI solution in PPA was applied to a glass plate at 220° C. by means of a preheated doctor blade (381 μm). A transparent membrane was obtained. The membrane was then allowed to stand at RT for 1 day.

Specimen 3: (PPA/3sPBI Membrane)

24.76 g of 85% strength phosphoric acid and 4.97 g of 96% strength sulfuric acid were added to 100 g of the above-described 5% strength PBI stock solution in 113.6% of PPA at 220° C. over a period of 30 minutes. This solution was stirred at 220° C. for a further 4 hours. The resulting sulfonated PBI solution in PPA was applied to a glass plate at 220° C. by means of a preheated doctor blade (381 μm). A transparent membrane was obtained. The membrane was then allowed to stand at RT for 1 day.

Specimen 4: (PPA/4sPBI Membrane)

38.89 g of 85% strength phosphoric acid and 6.6288 g of 96% strength sulfuric acid were added to 100 g of the above-described 5% strength PBI stock solution in 113.6% of PPA at 220° C. over a period of 30 minutes. This solution was stirred at 220° C. for a further 4 hours. The resulting sulfonated PBI solution in 105.1% strength PPA was applied to a glass plate at 220° C. by means of a preheated doctor blade (381 μm). A transparent membrane was obtained. The membrane was then allowed to stand at RT for 1 day.

Specimen 5: (PPA/6sPBI Membrane)

41.22 g of 85% strength phosphoric acid, 19.333 g of 115 strength polyphosphoric acid and 9.943 g of 96% strength sulfuric acid were added to 100 g of the above-described 5% strength PBI stock solution in 113.6% of PPA at 220° C. over a period of 30 minutes. This solution was stirred at 220° C. for a further 4 hours. The resulting sulfonated PBI solution in PPA was applied to a glass plate at 220° C. by means of a preheated doctor blade (381 μm). A transparent membrane was obtained. The membrane was subsequently allowed to stand at RT for 1 day.

| Specimen | Thickness [μm] | IV [dl/g] | S content [%] | SO$_3$H content [%] | H$_3$PO$_4$ Content | IEC [meq/g] | IEC [eq/cm3] | at RT σ (S/cm) | at 120° C. σ (S/cm) |
|---|---|---|---|---|---|---|---|---|---|
| 1 | 210 | 1.14 | 4.16 | 14.4 | 14.23 | 138.56 | 2.5 | 0.092 | 0.064 |
| 2 | 231 | 1.16 | 6.22 | 21.5 | 15.71 | 153.01 | 3.21 | 0.083 | 0.082 |
| 3 | 186 | 1.1 | 8.49 | 29.4 | 20.16 | 196.36 | 3.16 | 0.099 | 0.054 |
| 4 | 184 | 1.14 | 8.95 | 30.6 | 19.78 | 192.66 | 3.14 | 0.09 | 0.089 |
| 5 | 218 | 1.14 | 9.16 | 31.7 | 23.08 | 224.76 | 3.22 | 0.096 | 0.092 |

The invention claimed is:

1. A proton-conducting polymer membrane which is based on sulfonated polymers based on polymers comprising recurring benzimidazole units and is made by a process comprising the steps
   A) mixing of one or more aromatic tetramino compounds with one or more aromatic carboxylic acids or esters thereof which contain at least two acid groups per carboxylic acid monomer, or mixing of one or more aromatic and/or heteroaromatic diaminocarboxylic acids, in a polyphosphoric acid/sulfonating agent mixture to form a solution and/or dispersion, the sulfonating agent is selected from the group consisting of i) concentrated sulfuric acid (>95%), ii) chlorosulfonic acid, iii) a complex of SO$_3$ with a Lewis base or other organic constituents, iv) an acyl or alkyl sulfate, and v) mixtures of i to iv,
   B) application of a layer using the mixture from step A) to a support or an electrode,
   C) heating of the sheet-like structure/layer made according to step B) under inert gas at temperatures of up to 350° C. to form the sulfonated polyazole polymer,
   D) treatment of the membrane formed in step C) in the presence of moisture at temperatures and for a time until the membrane is self-supporting and can be detached from the support without damage.

2. The membrane as claimed in claim 1, characterized in that aromatic tetramino compounds used are 3,3',4,4'-tetraminobiphenyl, 2,3,5,6-tetraminopyridine, 1,2,4,5-tetraminobenzene, bis(3,4-diaminophenyl)sulfone, bis(3,4-diaminophenyl)ether, 3,3',4,4'-tetraminobenzophenone, 3,3',4,4'-tetraminodiphenylmethane and 3,3',4,4'-tetraminodiphenyldimethylmethane.

3. The membrane as claimed in claim 1, characterized in that aromatic dicarboxylic acids used are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl)ether, benzophenone-4,4'-dicarboxylic acid, bis(4-dicarboxyphenyl)sulfone, biphenyl-4,4'-dicarboxylic acid, 4-trifluoromethylphthalic acid, 2,2-bis(4-carboxyphenyl)-hexafluoropropane, 4,4'-stilbenedicarboxylic acid, 4-carboxycinnamic acid, or their C1-C20-alkyl esters or C5-C12-aryl esters, or their acid anhydrides or acid chlorides.

4. The membrane as claimed in claim 1, characterized in that aromatic carboxylic acids used are tricarboxylic acids, tetracarboxylic acids or their C1-C20-alkyl esters or C5-C12-aryl esters or their acid anhydrides or their acid chlorides, preferably 1,3,5-benzenetricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid and/or 2,6-pyridinetricarboxylic acid.

5. The membrane as claimed in claim 1, characterized in that aromatic carboxylic acids used are tetracarboxylic acids, their C1-C20-alkyl esters or C5-C12-aryl esters or their acid anhydrides or their acid chlorides, preferably benzene-1,2,4,5-tetracarboxylic acid; naphthalene-1,4,5,8-tetracarboxylic acid, 3,5,3',5'-biphenyltetracarboxylic acid; benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

6. The membrane as claimed in claim 4, characterized in that the content of tricarboxylic acids or tetracarboxylic acids (based on dicarboxylic acids used) is from 0 to 30 mol %.

7. The membrane as claimed in claim 1, characterized in that heteroaromatic carboxylic acids used are heteroaromatic dicarboxylic acids and tricarboxylic acids and tetracarboxylic acids in which at least one nitrogen, oxygen, sulfur or phosphorus atom is present in the aromatic, preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1-C20-alkyl esters or C5-C12-aryl esters, or their acid anhydrides or their acid chlorides.

8. The membrane as claimed in claim 1, characterized in that aromatic and heteroaromatic diaminocarboxylic acids used are diaminobenzoic acid and its monohydrochloride and dihydrochloride derivatives.

9. The membrane as claimed in claim 1, characterized in that a polyphosphoric acid having an assay calculated as P$_2$O$_5$ (acidimetric) of at least 83% is used in step A).

10. The membrane as claimed in claim 1, characterized in that a polymer which comprises recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/ or (XV) and/or (XVI) and/or (XVII) and/or (XVIII) and/or (XIX) and/or (XX) and/or (XXI) and/or (XXII)
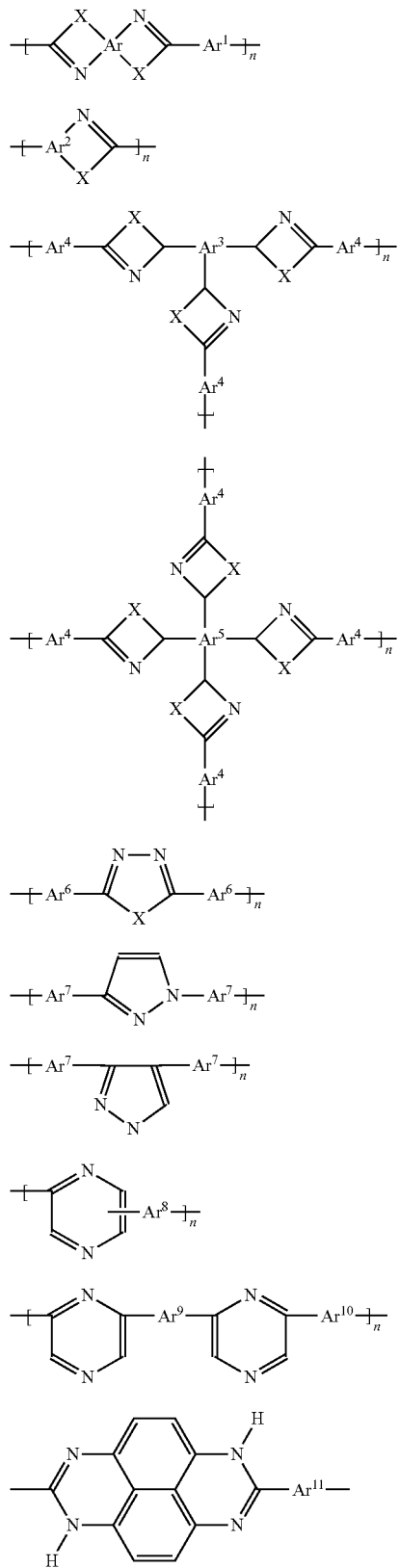
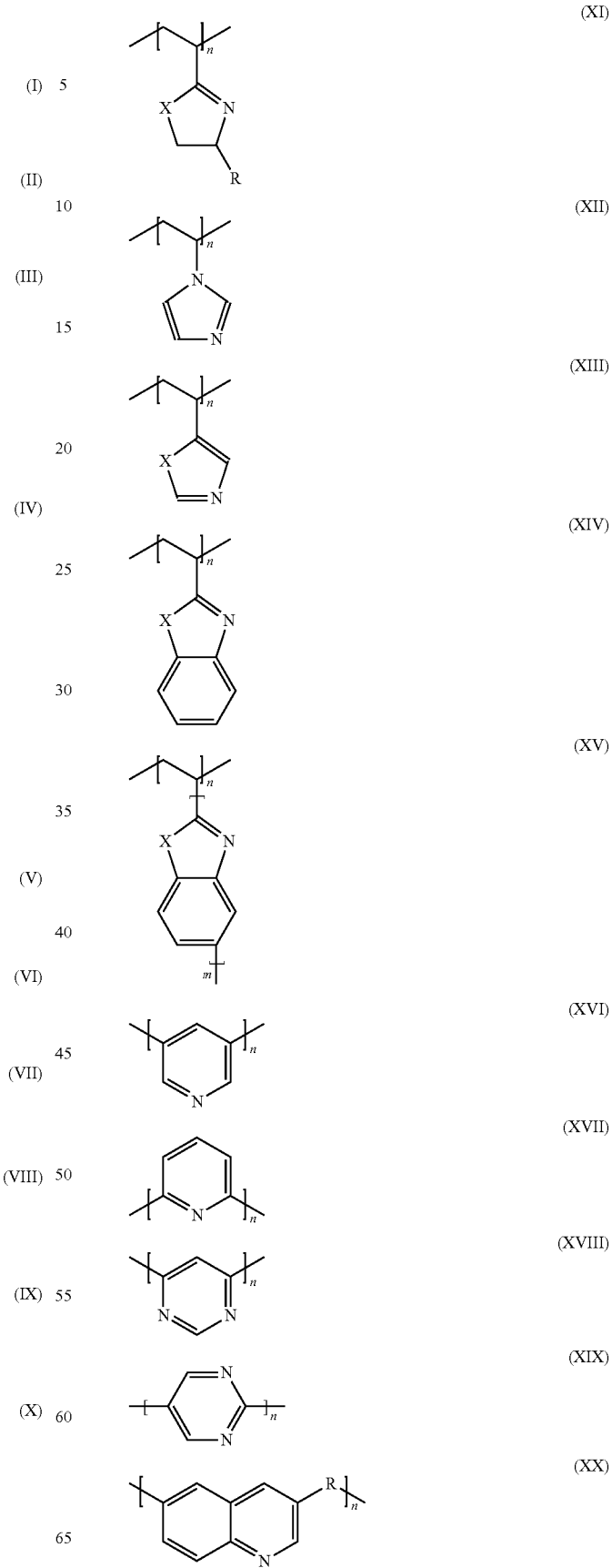

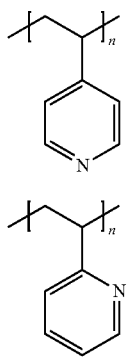

(XXI)

(XXII)

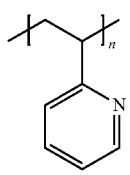

where
the radicals Ar are identical or different and are each a tetravalent aromatic or heteroaromatic group which can be monocyclic or polycyclic,
the radicals $Ar^1$ are identical or different and are each a divalent aromatic or heteroaromatic group which can be monocyclic or polycyclic,
the radicals $Ar^2$ are identical or different and are each a divalent or trivalent aromatic or heteroaromatic group which can be monocyclic or polycyclic,
the radicals $Ar^3$ are identical or different and are each a trivalent aromatic or heteroaromatic group which can be monocyclic or polycyclic,
the radicals $Ar^4$ are identical or different and are each a trivalent aromatic or heteroaromatic group which can be monocyclic or polycyclic,
the radicals $Ar^5$ are identical or different and are each a tetravalent aromatic or heteroaromatic group which can be monocyclic or polycyclic,
the radicals $Ar^6$ are identical or different and are each a divalent aromatic or heteroaromatic group which can be monocyclic or polycyclic,
the radicals $Ar^7$ are identical or different and are each a divalent aromatic or heteroaromatic group which can be monocyclic or polycyclic,
the radicals $Ar^8$ are identical or different and are each a trivalent aromatic or heteroaromatic group which can be monocyclic or polycyclic,
the radicals $Ar^9$ are identical or different and are each a divalent or trivalent or tetravalent aromatic or heteroaromatic group which can be monocyclic or polycyclic,
the radicals $Ar^{10}$ are identical or different and are each a divalent or trivalent aromatic or heteroaromatic group which can be monocyclic or polycyclic,
the radicals $Ar^{11}$ are identical or different and are each a divalent aromatic or heteroaromatic group which can be monocyclic or polycyclic,
the radicals X are identical or different and are each oxygen, sulfur or an amino group which bears a hydrogen atom, a group having 1-20 carbon atoms, preferably a branched or unbranched alkyl or alkoxy group, or an aryl group as further radical,
the radicals R are identical or different and are each hydrogen, an alkyl group or an aromatic group and
n, m are each an integer greater than or equal to 10, preferably greater than or equal to 100,
and has a sulfur content of from 2 to 20% by weight (determined by means of elemental analysis), is formed in step C).

11. The membrane as claimed in claim 1, characterized in that the viscosity is adjusted by addition of phosphoric acid after step A) and before step B).

12. The membrane as claimed in claim 1, characterized in that the treatment of the membrane in step D) is carried out at temperatures from above 0° C. to 150° C., in the presence of moisture or water and/or steam.

13. The membrane as claimed in claim 1, characterized in that an electrode is selected as support in step B) and the treatment according to step D) is such that the membrane formed is no longer self-supporting.

14. A membrane-electrode unit comprising at least one electrode and at least one membrane as claimed in claim 1.

15. The membrane as claimed in claim 1, characterized in that the heating being conducted at temperatures up to 280° C.

16. The membrane as claimed in claim 6, characterized in that the content of tricarboxylic acids or tetracarboxylic acids (based on dicarboxylic acids used) is from 0.1 to 20 mol %.

17. The membrane as claimed in claim 6, characterized in that the content of tricarboxylic acids or tetracarboxylic acids (based on dicarboxylic acids used) is from 0.5 to 10 mol %.

18. The membrane as claimed in claim 12, characterized in that the treatment of the membrane in step D) is carried out at temperatures in the range from 10° C. to 120° C., in the presence of moisture or water and/or steam.

19. The membrane as claimed in claim 1, characterized in that the treatment of the membrane in step D) is carried out at temperatures from room temperature (20° C.) to 90° C., in the presence of moisture or water and/or steam.

* * * * *